(12) United States Patent
Churovich et al.

(10) Patent No.: US 12,294,778 B2
(45) Date of Patent: May 6, 2025

(54) ELECTRONIC VISUAL FOOD PROBE

(71) Applicant: RZP Holdings, Inc., Des Peres, MO (US)

(72) Inventors: Douglas D Churovich, Des Peres, MO (US); Jeffrey D. Marsh, Foristell, MO (US)

(73) Assignee: RZP Holdings, Inc., Des Peres, MO (US)

( * ) Notice: Subject to any disclaimer, the term of this patent is extended or adjusted under 35 U.S.C. 154(b) by 411 days.

(21) Appl. No.: 17/841,621

(22) Filed: Jun. 15, 2022

(65) Prior Publication Data

US 2022/0400195 A1     Dec. 15, 2022

Related U.S. Application Data

(60) Provisional application No. 63/210,583, filed on Jun. 15, 2021.

(51) Int. Cl.
*H04N 23/56* (2023.01)
*G01K 1/02* (2021.01)
*H04N 23/50* (2023.01)
*H04N 23/57* (2023.01)

(52) U.S. Cl.
CPC .............. *H04N 23/56* (2023.01); *G01K 1/02* (2013.01); *H04N 23/57* (2023.01); *G01K 2207/02* (2013.01); *H04N 23/555* (2023.01)

(58) Field of Classification Search
CPC ...... H04N 23/56; H04N 23/57; H04N 23/555; G01K 1/02; G01K 2207/02; G01K 13/00; G01K 1/024; G01K 2207/06
See application file for complete search history.

(56) References Cited

U.S. PATENT DOCUMENTS

| | | | |
|---|---|---|---|
| 10,969,572 B2 | 4/2021 | Churovich | |
| 11,366,305 B2 | 6/2022 | Churovich | |
| 2011/0193938 A1* | 8/2011 | Oderwald | A61B 1/00181 348/45 |
| 2012/0182458 A1* | 7/2012 | Ishii | G03B 17/17 359/833 |
| 2014/0213850 A1* | 7/2014 | Levy | A61B 1/018 600/156 |
| 2017/0329125 A1* | 11/2017 | Churovich | H04N 23/56 |
| 2020/0363625 A1* | 11/2020 | Baumann | H04N 23/55 |
| 2021/0267442 A1* | 9/2021 | Petersen | A61B 1/042 |

* cited by examiner

*Primary Examiner* — Sinh Tran
*Assistant Examiner* — Zhenzhen Wu
(74) *Attorney, Agent, or Firm* — Douglas D. Churovich, Esq.

(57) ABSTRACT

An electronic visual food probe for insertion into and viewing of the interior of a body of food. The distal end of the stem has one or more openings that collectively allow light into and out of the cavity, the opening(s) exhibiting a degree of radial displacement. A light source in the stem illuminates the interior of the food exposed to the opening. An electronic image sensor receives the light reflected from the interior surfaces of the food proximate the opening(s) and generates an elongated color image of the reflected light. An electronic display system displays the elongated color image.

24 Claims, 7 Drawing Sheets

ELECTRONIC VISUAL FOOD PROBE

CROSS REFERENCE TO RELATED APPLICATIONS

This application claims priority to U.S. App. No. 63/210,583 filed Jun. 15, 2021, which is entitled "Improved Electronic Visual Food Probe Stem", and which is incorporated herein by reference.

STATEMENT REGARDING FEDERALLY SPONSORED RESEARCH OR DEVELOPMENT

Not applicable.

BACKGROUND OF THE INVENTION

This invention relates generally to an electronic apparatus to facilitate the viewing of a sliver or length of a portion of food such as, for example, the visual sampling of the interior of a piece of cooked meat, and more particularly to a novel electronic probe that generates a substantially accurate visual image of the coloration of an interior sliver or length within a piece of cooked meat in a single scan for determination of sufficient level of cooking.

It is often desirable when cooking or grilling foods, and in particular when grilling meats, to determine whether the meat has been cooked sufficiently in the interior or body of the meat being cooked. One well-recognized method to determine the extent to which the interior or body of a piece of meat has been cooked is to measure or monitor the internal temperature of the item. This may entail a simple temperature measurement at a single location in the body of the piece of meat, or may be more complex, such as for example obtaining multiple temperature measurements and/or monitoring at one or multiple locations in the body of the piece of meat and/or at various depths in the body or interior of the piece of meat. It is also often desirable to determine the interior temperatures while the meat is still being cooked. That is, it is often desirable to be able to measure the meat's interior temperature without removing the food meat from its cooking environment, such as an oven or grill.

Not surprisingly, a wide variety of devices exist in the art that can determine the temperature of a piece of cooked meat. These devices may comprise a single or multiple temperature probes coupled with analog or digital readouts or displays, and may operate on mechanical or electronic principles, and can incorporate other various features such as for example, a separate probe and temperature display, rechargeable batteries, an elongated handle or grip, or a backlight display. However, temperature probes do not provide the ability to visually scan the interior of the cooked piece of meat.

Often, in addition to determining the interior temperature of a cooked piece of meat, it is desirable to examine the coloration of the interior of the meat to more accurately ascertain the distribution of the degree of cooking the piece of meat has attained. This has traditionally been accomplished by slicing into the meat while still in the cooking environment with a knife or other utensil to open the meat's interior for a visual inspection, or first removing the piece of meat from the cooking environment and then slicing into the meat with a knife or other utensil to open the meat's interior to view. Of course, cutting and viewing the meat while still in its cooking environment is difficult and uncomfortable at the least, and potentially dangerous at the worst in exposing the person cooking the meat to extremely high heat, searing heated metal, and open flames. In addition, this traditional technique has the undesirable result of marring the meat prior to presentation and consumption. Further, whether in the cooking environment or after being removed from the cooking environment, slicing or cutting the meat exposes those portions of the meat to the low temperature environment prematurely, which results in discoloration and less appeal, and can lead to the determination that additional cuts or slices or cooking may be warranted.

U.S. Pat. No. 10,969,572 (the "572 Patent") and U.S. Pat. No. 11,366,305 (the "305 Patent"), both issued to Churovich, disclose and claim various configurations of an electronic visual food probe that address these issues. However, it has been found by Applicants here that the elongated opening and window in the tip of the probe of the 572 and 305 Patents present a number of engineering and cost challenges. For example, due to the desirability of constructing a visual food probe with a very small diameter tip, it was found that placing optical components into such a confined space that track the linear (i.e., axially) oriented elongated opening along the length of the probe tip greatly reduces the density of optical components that can be placed in that space. Further, when looking down into the probe tip from the handle, it becomes apparent that only a limited number of optical components (i.e., lenses, cables, etc.) can be functionally positioned along the elongated opening of the 572 and 305 Patents. These dimensional limitations adversely impact the potential resolution and image replication of the probe tip, and increase the costs to resolve such issues and produce products consistent with the 572 and 305 Patents. The present application presents improvements over the 572 and 305 Patent probes that overcome some of these limitations.

BRIEF DESCRIPTION OF THE DRAWINGS

The illustrative embodiments of the present invention are shown in the following drawings which form a part of the specification

Corresponding reference characters indicate corresponding parts throughout the several views of the drawings.

DETAILED DESCRIPTION

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
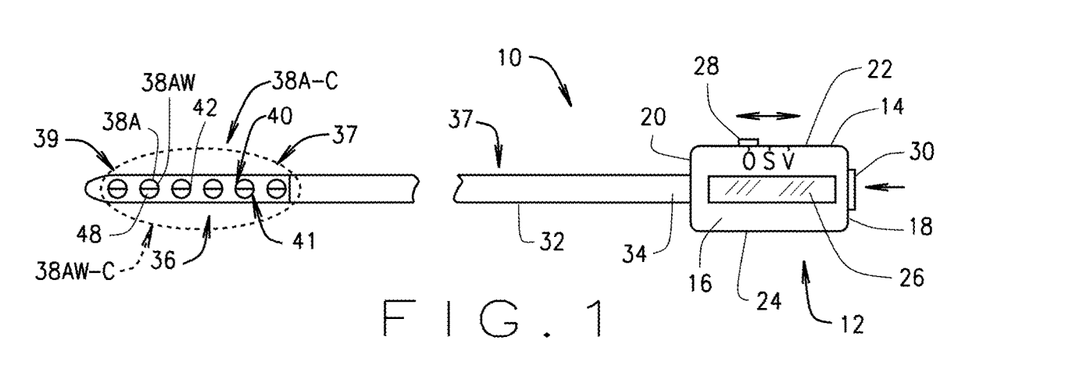
FIG. 1 is a split plan view a first representative embodiment of an electronic visual food probe incorporating features of the present invention.
Figure 2:
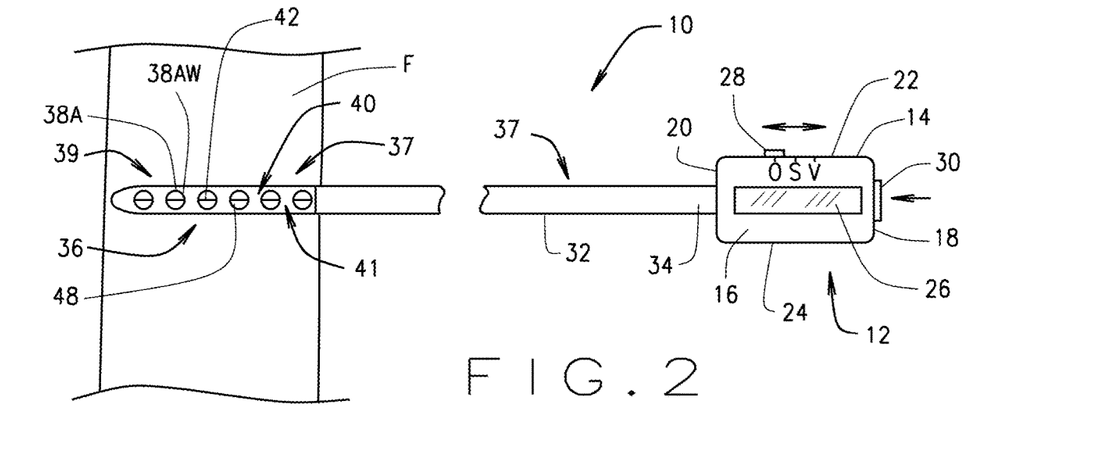
FIG. 2 is a split plan view of the food probe of FIG. 1, with the stem of the probe partially inserted into a body of food.

In referring to the drawings, a first representative embodiment of the novel electronic visual food probe 10 of the present invention is shown generally in FIG. 1, where the present invention is depicted by way of example, and in FIG. 2, where the present invention is depicted by way of example inserted into a body of food F. In this first representative embodiment, the food probe 10 comprises an electronic display system 12 contained in a slightly flattened box-shaped handle 14, having dimensions of approximately one inch wide by two inches long by ½ inch deep. The handle 14 has a generally rectangular face 16, a first end 18, a second end 20 parallel to and opposite the first end 18, a first side 22 and a second side 24 parallel to and opposite the first side 22. A flat digital color display 26 is positioned generally in the center of the outer surface of face 16 of the handle 14. A three-position mode switch 28 is positioned on the first side 22 of the handle 14, and an activation button switch 30 is positioned on the first end 18 of the handle 14. Of course, the configuration, shape and dimensions of the handle 14 are not limited to these particular specifications, but can vary substantially for a variety of reasons, including without limitation, aesthetic considerations, ability to house various shapes and sizes of components in the handle 14.

An elongated, rigid, substantially uniform tubular stem 32, having a proximal end 34 and a distal end 36, extends at its proximal end 34 from the second end 20 of the handle 14, where the stem 32 is rigidly attached to the handle 14. From its distal end 36 to its interface with the electronic display system 12, the stem 32 defines an inner cavity 37 (see FIG. 4). A seal 37A seals the upper end of the cavity 37 inside the stem 32 proximate the interface between a pair of optical elements (i.e., optical elements 42 and 48) and their respective fiber optic cables 44 and 50, in order to prevent the intrusion of moisture, food components or other such undesirable material, such that the cavity 37 and stem 32 form a housing 39 for the optical elements 42 and 48. In order to achieve the operation as explained herein, one of ordinary skill in the art will understand that the optical elements 42 and 48 may comprise a variety of optical subcomponents, such as for example: (i) a light admitting optical face; (ii) a mirror; (iii) an optical lens; (iv) a compound optical lens; (v) a diffraction optic; (vi) a collection of micro-optical lenses; and (vii) an array of optical lenses, where such components effectuation the directing and collection of light in accordance with the disclosure herein.

Figure 4:
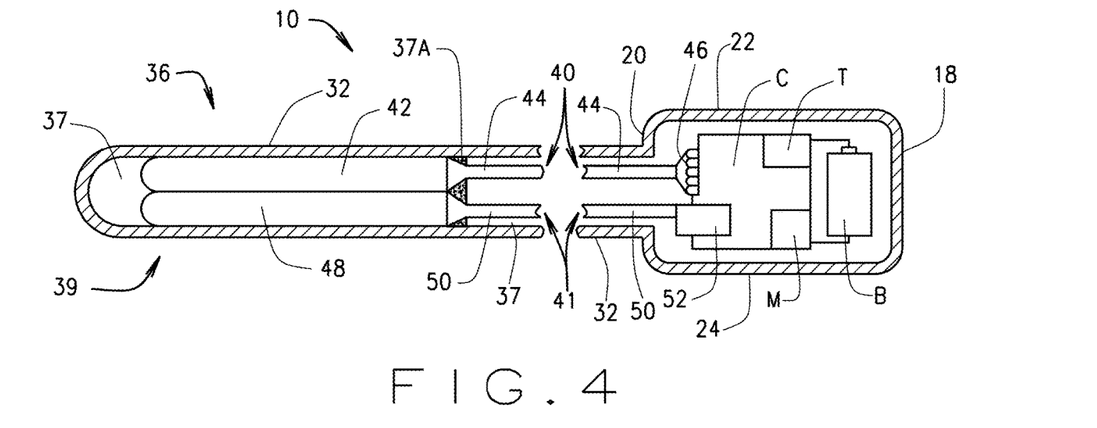
FIG. 4 is a split cross-sectional plan view of the food probe of FIG. 1.

The seal 37A is formed of a solidified liquid sealant material injected into the area above the optical elements 42 and 48. Of course, the cavity 37 can be filled with one or more materials and fixtures to positionally secure various components within the cavity 37, including for example, such materials as various adhesives, foams, and components such as tapes, and mounting brackets. Alternately, the cavity 37 and the housing 39 can be part of a separate component that can be selectively separated from and attached to the stem 32 (not shown).

Referring again to FIGS. 1 and 2, the stem 32 is approximately eight inches long, has an outer diameter of preferably less than one-fourth inch. The probe 10 incorporates a set of six small round openings 38A that are positioned along the distal end 36, with each housing a rigid window 38AW that allows for the transmission of visible light. The windows 38AW, although separated from one another, together form an elongated collective window 38AW-C that includes the six windows 38AW that stretch from the first window 38AW nearest the tip 33 of the stem 32 toward the proximal end 34 of the stem 32. As is shown, a set of optical elements, the optical elements 42 and 48, are both positioned inside the stem 32 proximate the elongated collective window 38AW-C. The collective window 38AW-C at its widest has a width of approximately one fourth the circumference of the stem 32, and extends from a position near the tip 33 of the distal end 36 of the stem 32 approximately two inches toward the proximal end 34. The collective window 38AW-C will have a length of at least one-half inch. The portion or length of the stem 32 having the collective window 38AW-C may be referred to as the imaging section of the probe 10.

The stem 32 encases two optical or light transmitting conduits, 40 and 41. The light transmitting conduit 40 comprises a first fiber optic cable 44, which attaches at one end to the first elongated optical element 42, and attaches at the opposite end to an optical lens 45 that collects light from a light-emitting-diode ("LED") array 46. The first optical element 42 is secured inside the stem 32 behind the collective window 38AW-C and connects to the first fiber optic cable 44. The first fiber optic cable 44 then extends up through the stem 32 and into the handle 14, where it connects to the optical lens 45 positioned adjacent the LED array 46, both being housed in the handle 14. The first optical element 42, the first fiber optic cable 44 and the LED array 46 are interconnected and configured such that when the LED array 46 is activated, the light so generated will travel through the first fiber optic cable 44 and into the first optical element 42. The optical element 42 receives the LED light from the fiber optic cable 44 and redirects the light to a direction perpendicular to and away from the central axis of the tubular stem 32 and in a dispersed length such that the light generated by the LED array 46 exits each of the windows 38AW and spreads radially outward relative to the central axis of the stem 32. As can be appreciated, light generated by the LED array 46 can thereby be directed to the inner surface of a body of food F or meat adjacent the windows 38AW when the distal end 36 of the stem 32 is inserted in the body of food F, to create an illuminated region of the body of food F proximate the windows 38AW.

The light transmitting conduit 41 comprises a second fiber optic cable 50 that attaches at one end to the second elongated optical element 48, and at the opposite end to a digital image sensor 52, where the image sensor 52 is fixedly positioned relative to the distal end 36 of the stem 32 and to the windows 38AW. The image sensor 52 may comprise a single electronic diode, or two or more electronic image collection components such as discrete CCD's or other electronic image devices or components. The second optical element 48 is secured inside the stem 32 behind the windows 38AW generally parallel to the first optical element 42, and connects to the second fiber optic cable 50. The second fiber optic cable 50 then extends up through the stem 32 and into the handle 14, where it connects to the digital image sensor 52. The second optical element 48, the second fiber optic cable 50 and the digital image sensor 52 are interconnected and configured such that light entering the second optical element 48 from the windows 38AW in the stem 32 travels through the second optical element 48, is directed at a right angle up and through the second fiber optic cable 50, and to the digital image sensor 52. The digital image sensor 52 collects a color image of the light from the second fiber optic cable 50 that has been reflected by a cross-section of the body of food F exposed to the collective window 38AW-C (i.e., the illuminated region), and converts the images into electronic data representative of the color images of the interior of the body of food F (such as meat) thus received. The second optical element 48 collects light from substantially all of the windows 38AW inserted into the body of food. Thus, as can be understood, when the distal end 36 of the stem 32 is inserted into a body of food F (such as a cooked piece of meat) the fiber probe 10 creates a long and thin electronically displayable collection of images (i.e., electronically displayable images) of the coloration of the interior portion of that food item along the length of the windows 38AW in the stem 32, which are sent to the digital image sensor 52 by the light transmitting conduit 41.

Referring again to FIG. 4, a small computer processor C is housed in the handle 14 and acts as an electronic data converter to convert the images generated by the digital image sensor 52 into electronic still or video data files. The computer processor C stores these electronic files in a digital memory unit M attached to the computer processor C in the handle 14, and displays the image on the flat digital color display 26. A small replaceable battery B, housed in the handle 14, provides electronic power to operate the electronic components of the probe 10. The computer processor C, memory unit M, color display 26 and battery B, collectively comprise an electronic display system.

Of course, the strip-shaped image obtained from the elongated collective window 38AW-C will comprise a collection of discrete images corresponding to images obtained from the individual windows 38AW. However, the computer processor C is programmed with computer code that interpolates the series of discrete images from the individual windows 38AW such that the individual images are blended or interlaced together to form a single contiguous strip-shaped color displayable image. Moreover, the computer C may be further programmed to modify the electronic data so as to generate an enhanced electronically displayable image that is substantially uniform in width and/or image intensity.

The three-position mode switch 28 allows a user to select between three modes: (i) OFF, which deactivates the probe 10 electronic components; (ii) PHOTO, which only allows the probe 10 to take instantaneous photo, or "still" shots of the interior of the food being probed; and (iii) VIDEO, which allows the probe 10 to act as a video camera. The button switch 30 activates the camera functions of the probe 10. That is, when the distal end 36 of the stem 32 is inserted into a body of food (such as a cooked piece of meat), and when the three-position mode switch 28 is in the PHOTO position, the probe 10 will take a "still" image of the interior of the food (such as cooked meat) along the length of the window 38 of the stem 32 when the button switch 30 is depressed as shown in FIG. 1. Similarly, when the distal end 36 of the stem 32 is inserted into a body of food (such as a cooked piece of meat), and when the three-position mode switch 28 is in the VIDEO position, the probe 10 will take a "video" image of the interior of the food (such as cooked meat) along length of the window 38 of the stem 32, starting when the button switch 30 is first depressed and stopping when the button switch 30 is depressed a second consecutive time. These images, whether still or video, are stored in the digital memory unit M and displayed on the flat digital color display 26.

As can be appreciated, the displayable collective or interpolated images generated by the probe 10 are elongated and relatively thin strip- or sliver-shaped to correspond to the same-shaped cross-section portions of the body of food F or cooked meat adjacent the collective window 38AW-C. Accordingly, the displayable images will have a length substantially longer than the average width of the distal end 36 of the stem 32, typically at least one-half inch, such as for example a length that is at least twice the average width of the distal end 36 of the stem 32. Of course, the length of the displayable images may be three, four, five or even more, greater than the average width of the windows 38AW and/or the distal end 36 of the stem 32. Such elongated displayable images generated by the probe 10 provide a spectrum view of the cross-section of the body of food F adjacent the collective window 38AW-C. Hence, inserting the imaging section of the stem 32 in a generally perpendicular fashion into a one inch thick meat steak (see, e.g., FIG. 2) will allow the probe 10 to quickly generate an accurate strip- or sliver-shaped color-indicative or colored displayable image on the digital color display 26 that spans the full width of the interior of the steak. This provides the user with a quick and accurate visual check on the degree to which the steak has been cooked, or the "doneness" of the steak, and an actual representation of the color spectrum of the meat across the entire width of the steak at the point of insertion of the probe 10.

Further, it may be desirable to only display a portion of the strip-shaped color image, such as for example when only a portion of the collective window 38AW-C (i.e., only some of the windows 38AW) penetrates into the body of food F and the remainder of the collective window 38AW-C will reveal no portion of the interior cross-section of the body of food F. In such circumstances, the electronic display system of the probe 10 is adapted to truncate the strip- or sliver-shaped color image that is displayed on the digital color display 26 so as to only display on the electronic display 26 the cross-section of the body of food F actually pressed against the distal end of the probe 10. This can be accomplished in various ways well known to those of skill in the art. For example, in one embodiment, computer code instructs the computer processor C to identify digital pixels in the strip- or sliver-shaped color image that do not correspond in color to the food F being probed (such as for example a bright yellow or a black), and eliminate those pixels from the image being displayed. In another embodiment, a mechanical sensor (not shown) can be mounted proximate the collective window 38AW-C that determines the depth the probe 10 penetrates the body of food F, communicates that information to the computer processor C, and the computer code instructs the computer processor C to truncate that portion of the strip- or sliver-shaped color image that is calculated to be outside the body of food F.

Other such various techniques, known to those skilled in the art, can alternatively be implemented.

Preferably, the entire probe 10 is constructed of materials that are physically rugged, food-safe (usable for contact with food products and goods without causing harm to the food or the consumer of the food), and can withstand the heat from cooking environments, up to and including the heat generated near open flames, such as for example a fire pit or BBQ grill, such that the food probe 10 can function properly and safely in such environments and under such conditions. However, the probe 10 can be constructed such that just the stem 32 and the windows 38AW comprise materials that are physically rugged, food-safe, and can thermally insulate the cavity 37 from the heat generated by cooking, including the heat generated by open cooking flames, such as those generated in a barbeque grill, fire pit, oven or stove. Such temperatures may for example be as low as 200 degrees Fahrenheit, or may be higher, including various temperatures across the range of 200 degrees Fahrenheit to 600 degrees Fahrenheit, or even higher. The term "food-safe" meaning that the material can be used in conjunction with the preparation and serving of food items for human consumption.

Figure 3:
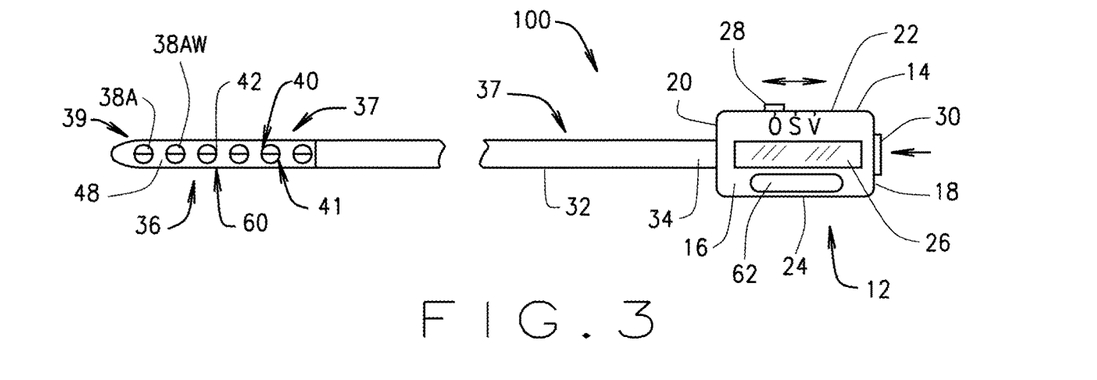
FIG. 3 is a split plan view of a second representative embodiment of the food probe of an electronic visual food probe incorporating features of the present invention.

Referring to FIG. 3, a second embodiment 100 of the present invention is shown. The probe 100 incorporates all of the features of the probe 10, but includes a temperature sensor 60 positioned in the stem 32 proximate the second optical element 48 in the vicinity of the collective window 38AW-C. The temperature sensor 60 measures the temperature of the body of food F in proximity to the collective window 38AW-C and generates an electronic signal indicative of the temperature so measured. The temperature sensor 60 is connected by wire through the stem 32 and into the electronic display system 12 to connect to the computer processor C. The computer processor C receives the electronic signal from the temperature sensor 60, converts the signal into an electronic display signal indicative of the temperature measured by the sensor 60, and generates a display on a second LCD display 62 as readable characters in degrees Fahrenheit and Centigrade indicative of the temperature measured by the temperature sensor 60. Of course, alternatively, the temperature and the digital image of the cross-section of the body of food F can both be displayed on a single electronic display.

Figure 8:
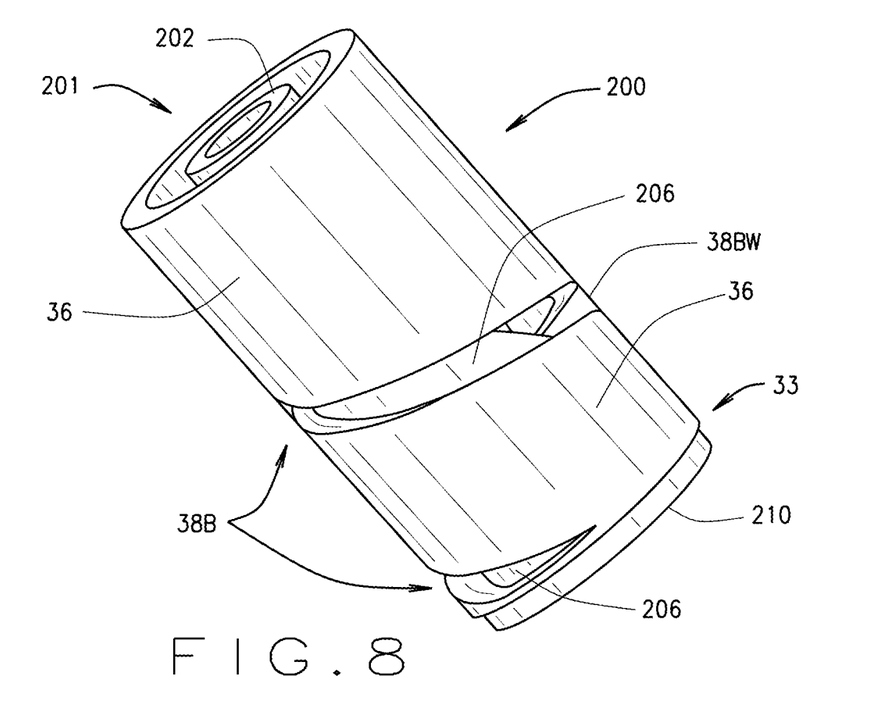
FIG. 8 is a perspective view of an alternate stem embodiment and associated optical element for the probe of FIG. 1 and incorporating features of the present invention, the distal end of the stem having a helical elongated opening.
Figure 9:
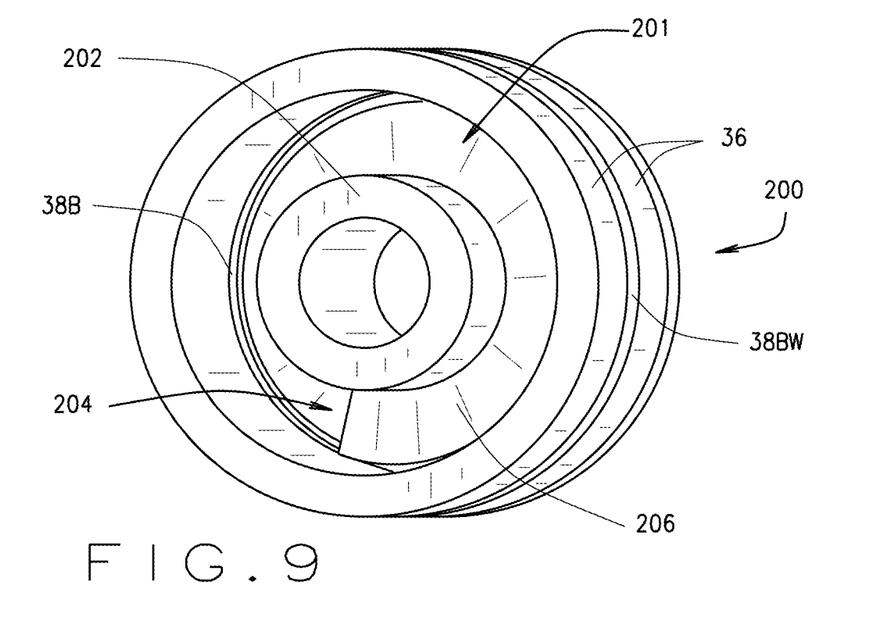
FIG. 9 is an alternate perspective view of FIG. 8.
Figure 10:
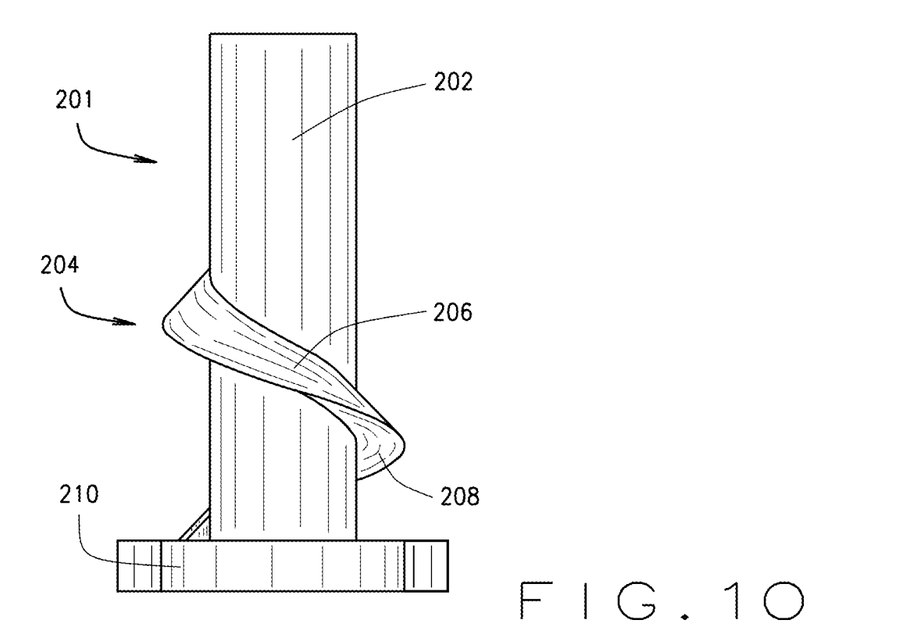
FIG. 10 is a side view of the optical element of FIG. 8.

FIGS. 8-11 depict an alternate embodiment of a stem assembly 200 for the present invention. The stem assembly 200 comprises an optical element 201 positioned in the cavity 37 in the distal end 36 of the stem 32. In contrast to the stem 32 of embodiment 10, the housing 39 does not have a closed tip. Instead, the housing 39 is open at the end and the optical element 201 has a base 210 that covers and is epoxied to the open end of the housing 39 to seal the cavity 37, when the optical element 201 is positioned in the stem 32. Referring to FIG. 10, it can be seen that the optical element 201 comprises a central cylindrical tube or shaft 202 formed of a substantially rigid material. The tube or shaft 202, can be solid or hollow, has a length of approximately two inches, and a diameter of approximately 0.060 inches. The shaft 202 extends upward from a coaxial flat circular plate or base 210 that has a diameter of approximately 0.200 inches and a thickness of approximately 0.020 inches.

Figure 11:
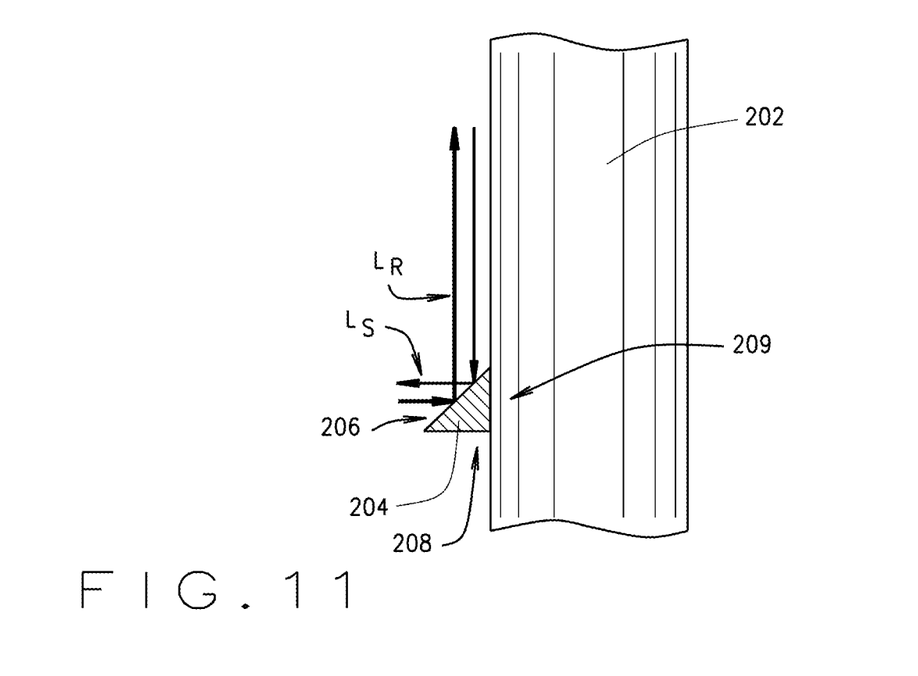
FIG. 11 is a side view of a portion of the optical element of FIG. 8 with a cross-sectional view of a helical angular ledge of said optical element.
Figure 12:
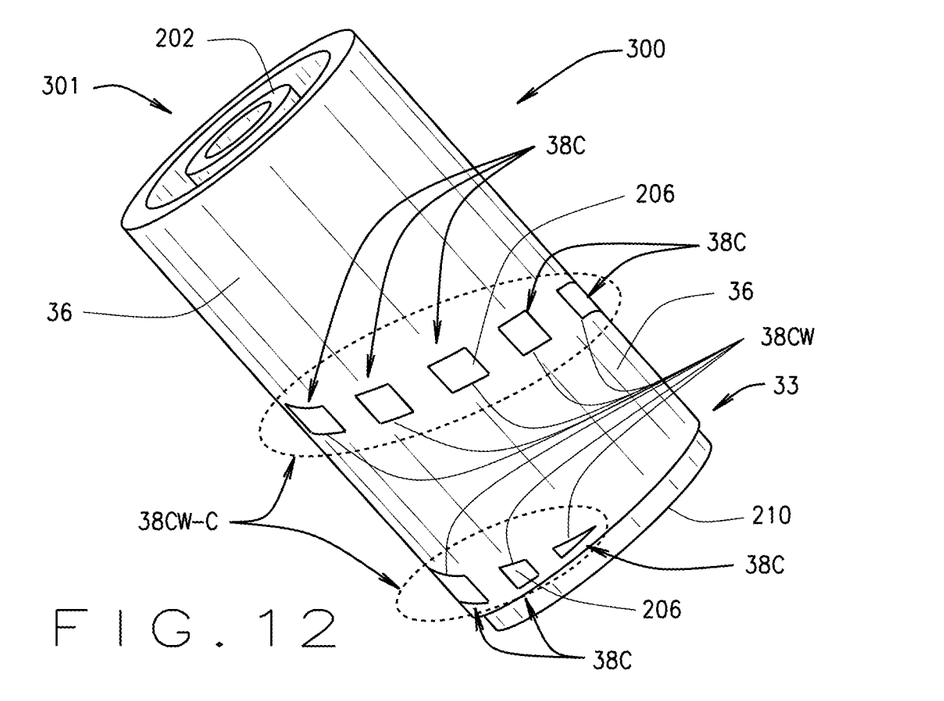
FIG. 12 is a perspective view of an alternate stem embodiment and associated optical element for the probe of FIG. 1 and incorporating features of the present invention, the distal end of the stem having a helical elongated opening.
Figure 13:
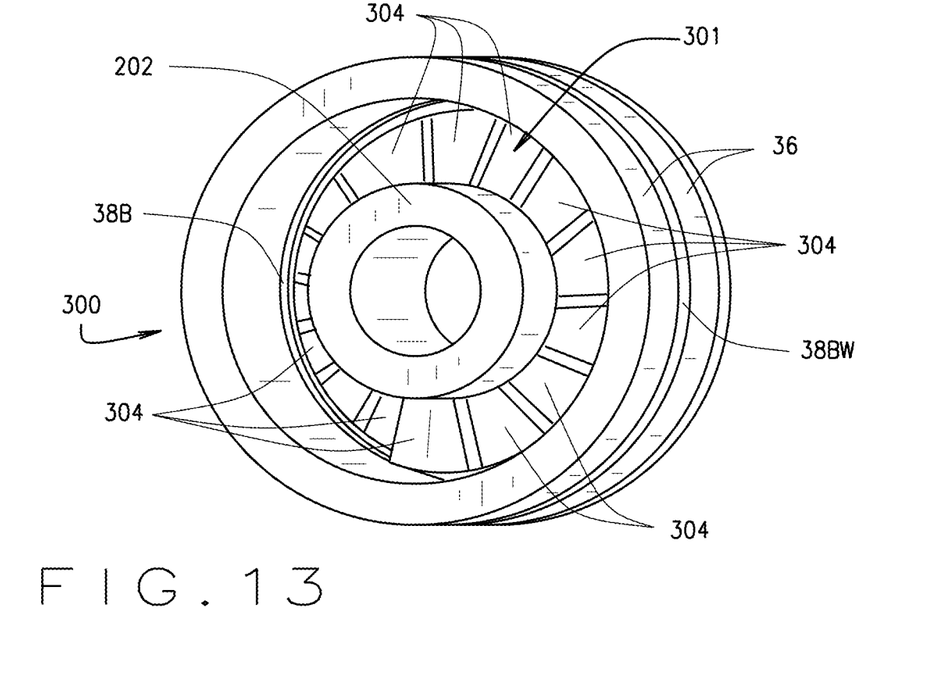
FIG. 13 is an alternate perspective view of FIG. 12.
Figure 14:
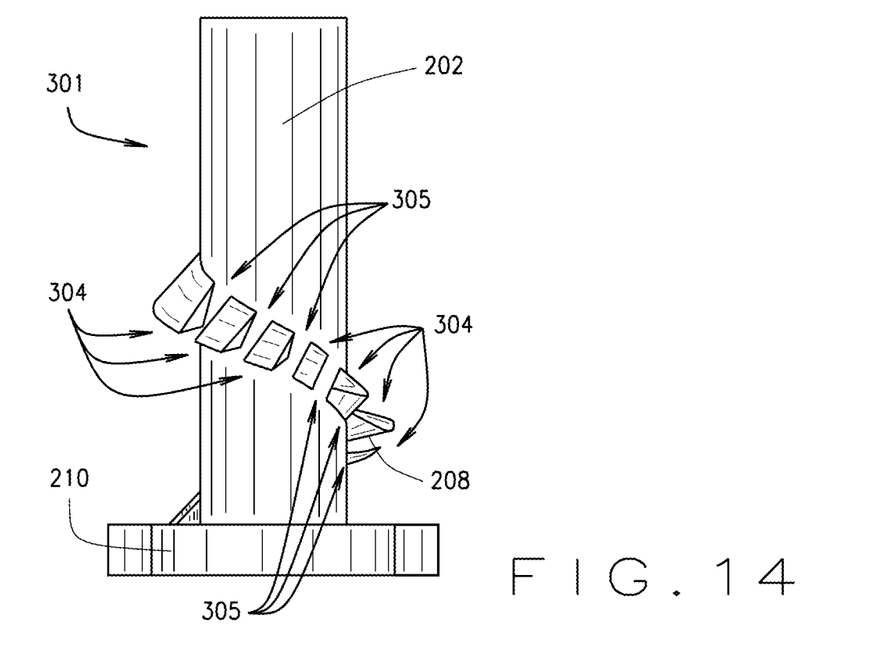
FIG. 14 is a side view of the optical element of FIG. 12.
Figure 15:
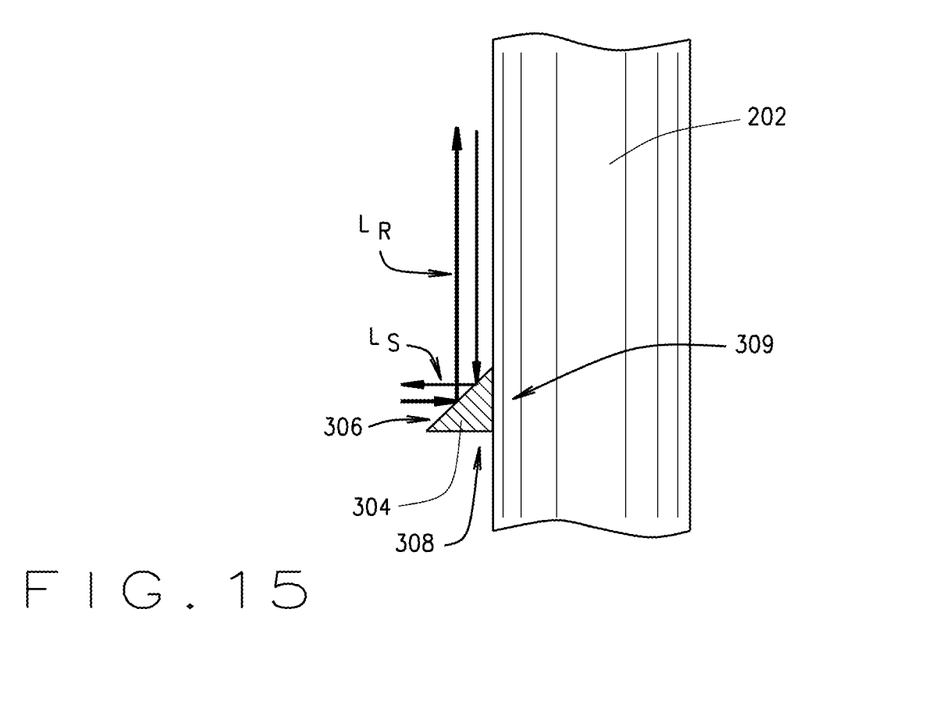
FIG. 15 is a side view of a portion of the optical element of FIG. 12 with a cross-sectional view of a helical angular ledge of said optical element.

An angular ledge 204, formed of a substantially rigid material, wraps around the tube or shaft 202 in a helical manner. Referring to FIG. 11, it can be seen that the angular ledge 204 has a right-triangular cross-section with an angular light-reflective upper face 206, a generally horizontal lower face 208 and a vertical side face 209 that is attached to the side of the central shaft 202. Of course, the angular ledge 204, the shaft 202 and/or the base 210 can be constructed or formed as a single component, such as for example by machining or 3D printing. The upper face 206 has a length of approximately 0.028 inches, the lower face 208 has a length of approximately 0.020 inches, and the side face 209 has a length of approximately 0.020 inches. The upper face 206 extends downward from the shaft 202 at an angle of 45 degrees relative to the vertical side of the shaft 202, and has been processed to be smooth and highly reflective of visible light. In addition, the upper face 206 has been treated with a highly reflective metallic coating in order to enhance its visible light reflecting properties.

Referring again to FIGS. 8 and 9, it can be seen that the optical element 201 is positioned within the distal end 36 of the stem 32. Further, a helical opening 38B is formed in the distal end 36 of the stem 32 that extends from nearly the very end of the distal end 36 to a height of approximately 2.0 inches that equals the length of the helical edge 204 of the optical element 201 above the base 210. The helical opening 38B has a width of approximately 0.020 inches and tracks a helical course about the distal end 36 that parallels the angular ledge 204, such that the lower edge of the helical opening 38B is horizontally parallel to the lower surface 208 of the angular ledge 204. A rigid material that allows the transmission of visible light fills the helical opening 38B to form a corresponding helical window 38BW.

The angular ledge 204 has a "pitch ratio" of one; i.e., one full revolution about the distal end 36 per functional longitudinal length of the helical window 38BW. Thus, in this particular embodiment 200, the ledge pitch has been set to one revolution per inch, which corresponds to a functional longitudinal length for the helical window 38BW of one inch. In this way, the helical window 38BW wraps once about the stem 32 and the two ends of the helical window 38BW each terminate at the same radial plane running along the length of the stem 32, such that there will be substantially no overlap longitudinal of any portion of the helical window 38BW.

As can appreciated, and referring to FIG. 11, as reflected visible light $L_R$ from the illuminated region of cross-section of the body of food proximate the helical window 38BW is directed inward into the cavity 37 through the helical window 38BW, the reflected visible light $L_R$ engages the reflective surface of the upper face 206 of the angular ledge 204. The reflected visible light $L_R$ is then reflected upward at a 90 degree angle by the upper face 206 between the exterior surface of the shaft 202 and the interior surface of the stem 32 toward the second end 20 of the handle 14. An electronic image sensor 52 (positioned along the interior of the stem 32 or in the handle 14) collects the reflected visible light $L_R$ from along the full length of the angular ledge 204. In this case, the interior of the stem 32 acts as the light transmitting conduit between the angular ledge 204 and the image sensor 52. While it is preferable that the helical window 38BW and the angular ledge 204 have the same helical lengths, it is not necessary that they are so. Rather, the helical window 38BW and the angular ledge 204 may instead have differing helical lengths. However, where the helical window 38BW is helically longer than the angular ledge 204, even when otherwise aligned as depicted herein, portions of the helical window 38BW will have no corresponding portion of the angular ledge 204. Where the helical window 38BW is helically shorter than the angular ledge 204, even when otherwise aligned as depicted herein, portions of the angular ledge 204 will not have a corresponding portion of the helical window 38BW.

As can also be appreciated, the assembly 200 can be configured in a variety of ways to provide visible supply light ($L_S$) to the cross-section of the body of food proximate the window 38BW that will reflect off of the food and as depicted in FIG. 11 onto the upper face 206 of the angular ledge 204. For example, the shaft 202, or portions of the shaft 202, can comprise a light transmitting conduit, such as for example one or more fiber optic cables. Supply light ($L_S$) can then be transmitted from a remote light source along the shaft 202 and outward toward the cross-section of food F through one or more formed or attached lenses or through a roughened outer surface. In another example, the shaft 202 can be comprised of a transparent or translucent material, and LED's or another light source can be placed in the hollow center of the shaft 202, or at one end of the shaft 202 for the light ($L_S$) to be transmitted along the length of the shaft 202. Similarly, a light transmitting conduit can for example extend down through the hollow center of the shaft 202 to supply light. Moreover, supply light may be provided by simply directing light downward toward the upper face 206 of the angular ledge 204, between the inner surface of the stem 32 and the shaft 202, as shown in FIG. 11.

FIGS. 12-15 depict another alternate embodiment of a stem assembly 300 for the present invention. The stem assembly 300 comprises the same basic configuration as the assembly 200, with the following differences. First, the helical angular ledge 204 is partitioned into a collection of discrete steps 304 with upper faces 306, where the steps are separated by uniform gaps 305. Each of the upper faces 306 maintains the same contours as its corresponding length of the upper face 206 of the ledge 204. Second, in place of the helical opening 38B and its associated helical window 38BW, a set of openings 38C, and associated windows 38BW, are formed in the distal end 36 of the stem 32 that correspond to the steps 304, which together form a "collective" helical window 38CW-C.

While we have described in the detailed description several configurations that may be encompassed within the disclosed embodiments of this invention, numerous other alternative configurations, that would now be apparent to one of ordinary skill in the art, may be designed and constructed within the bounds of our invention as set forth in the claims. Moreover, the above-described novel mechanisms of the present invention, shown by way of example in the various embodiments depicted in the figures, can be arranged in a number of other and related varieties of configurations without departing from or expanding beyond the scope of my invention as set forth in the claims, such as for example making insubstantial changes to the dimensions of the probe components.

For example, the light transmitting conduits 40 and 41 can comprise a wide variety of configurations so long as the conduit 40 is able to transmit the visible light from the light source though the probe and out to the interior portion of the food item, and the conduit 41 is able to collect the reflected light and direct it to one or more image sensors in the probe for conversion to a digital image, all as described hereinabove. Moreover, the light transmitting conduits 40 and 41 may be comprised of a wide variety of components, such as for example one or more fiber optic cables, light transferring crystals, encased gases or liquids that can transmit visible light, or even a contained body of air or a vacuum—so long as such conduit is capable of sufficiently transmitting light so as to provide the functionality as required by this disclosure.

In addition, the first fiber optic cable 44 and the second fiber optic cable 50 can each be constructed of a single cable, a bundle of cables or a collection of spliced cables, and one or either may be clad or unclad as desired, so long as each of the cables performs the functions as stated hereinabove. Also, it is not necessary that the light source for the probe 10 be an LED array, such as at 46, but can alternately be for example a light bulb, a single LED, a laser emitter, or any of a myriad of other electronic light emitting sources. Further, the first light transmitting conduit 40 can, for example, alternately be replaced with an LED array 46 (or other electronic light source) positioned in the window or windows (38AW, 38BW or 38CW). Similarly, the second light transmitting conduit 41 can be replaced with a system in which the electronic image sensor 52 is positioned in the window or windows (38AW, 38BW or 38CW), and transmits the electronic images to the computer C either through a wire or set of wires, a cable, a structural network, or wirelessly.

While preferable, it is not necessary for the stem 32 to be uniformly tubular or cylindrical. Rather, the stem 32 can be configured with a wide variety of cross-sectional shapes and sizes, so long as the stem 32 is capable of performing its allocated functions as described herein. Similarly, it is not necessary that the stem 32, the cavity 37 or the housing 39 extend in a straight and perpendicular fashion from the handle 14. Rather, any one or more of these components can be a myriad of various shapes and sizes, and can extend from the handle 14 in any of a variety of configurations, so long as the stem 32 and the imaging components can be inserted into the body of food F.

By way of further example, the stem 32 can be a variety of lengths, so long as the stem 32 has an imaging section that can be inserted into the food or meat. Likewise, each of the window or windows (38AW, 38BW or 38CW) can be a variety of lengths, widths and shapes, so long as the window or windows (38AW, 38BW or 38CW) provide the function of enabling the probe 10 to visually view and generate a displayable image indicative of the interior of a food item proximate the window or windows (38AW, 38BW or 38CW) as described hereinabove. While the probe 10 is operated by an internal battery B, any variety of appropriate power sources, such as for example a solar power array or an AC power cord, can be utilized to power the probe 10.

In addition, the digital color display 26 can be configured in any of a wide variety of shapes and sizes, so long as the digital color display 26 is capable of generating an electronically displayable image that substantially mimics or otherwise accurately indicates the coloration of the interior of the food product being probed.

Of course, the probe 10 need not operate with a computer C or a memory unit M, but can utilize other similar electronics, so long as such electronics provide the utility of enabling the probe 10 to take a color image from the interior of a body of food F and generate a replicated representative color image on a display, such as the digital color display 26.

In addition, the optical elements 42 and 48 can be a variety of differing shapes and sizes, and in particular can be longer or shorter or wider or thinner than depicted, or can be oriented differently within the cavity 37, so long as the lens 42 is capable of dispersing light from the LED array 46 through the window 38 in a manner to effectuate the function of the probe 10. Further, the optical elements 42 and 48 can be through lenses that allow the passage of light through the body of the lens. Alternately, the lenses 42 and 48 can be replaced with a reflective surface that merely change the direction of the light, such as for example a mirrored surface that directs light from the LED array 46 through the window 38 (for the transmitting conduit 40), or that directs light reflected from the body of food F through the window 38 and upward into the fiber optic cable 50 (for the transmitting conduit 41). Of course, the LED array 46 can be attached to the fiber optic cable 44, and the image sensor 52 can be attached to the fiber optic cable 50, in a number of ways well understood in the art, including for example, optical adhesives and optical fittings. In addition, the LED array 46 and the image sensor 52 need not be positioned in the handle 14. Rather, either or both of the LED array 46 and the image sensor 52 can be positioned wholly or at least in part in the cavity 37 or in the housing 39, or alternatively anywhere along the length of the stem 32, or even outside (at least in part) the stem 32, the cavity 37 and/or the housing 39.

Figure 5:
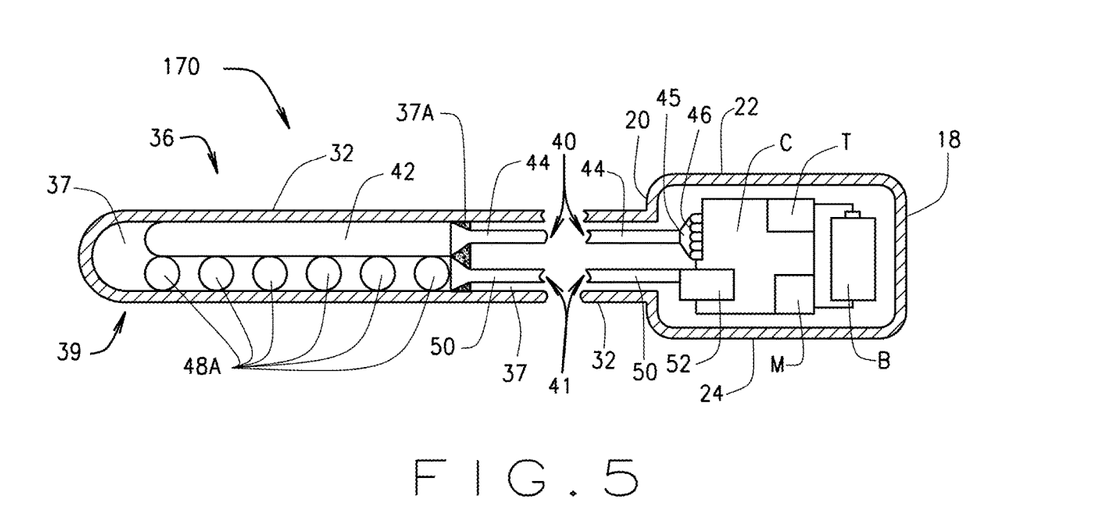
FIG. 5 is an alternate split cross-sectional plan view of the food probe of FIG. 1.

Referring to FIG. 5, another embodiment 170 of the present invention is shown. The probe 170 incorporates all of the features of the probe 10, but instead of a single elongated lens 48 stretching along all of the windows 38A, the probe 170 incorporates a series of lenses 48A, where each of the lenses 48A is positioned in the cavity 37 proximate a particular and corresponding window 38A. Moreover, each lens 48A is shaped and sized and oriented to collect a color image from its corresponding window 38A, and communicates that image through the light transmitting conduit 41 to the image sensor 52.

Figure 6:
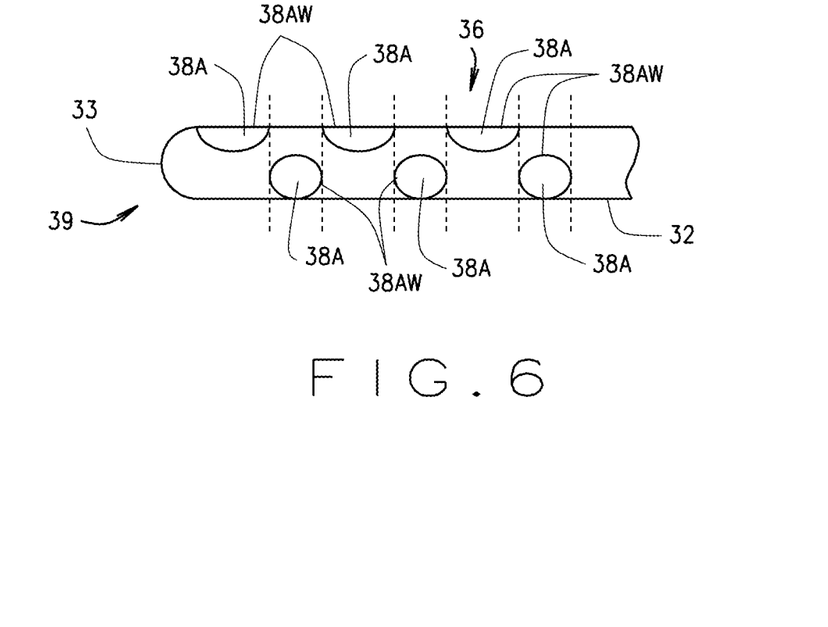
FIG. 6 is a plan view of an alternate embodiment of the distal end of the probe stem of FIG. 1, showing axial continuity of numerous openings along the distal end of the stem.
Figure 7:
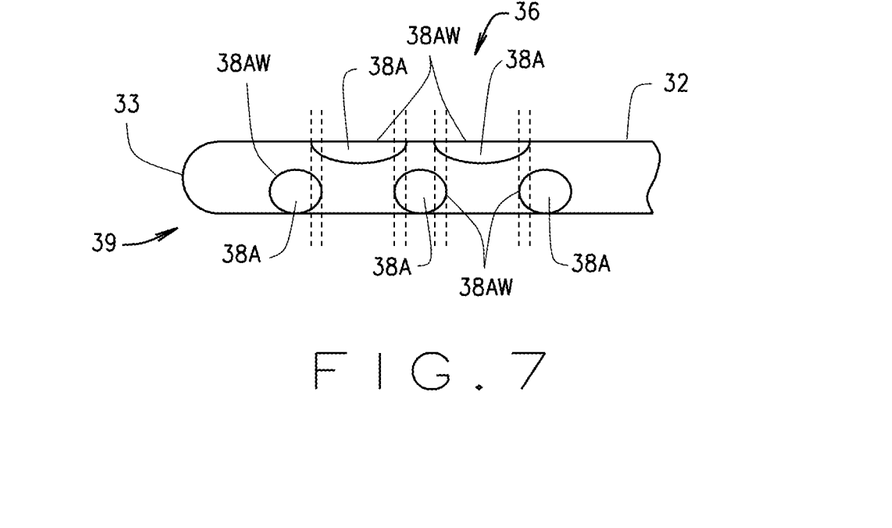
FIG. 7 is a plan view of an alternate embodiment of the distal end of the probe stem of FIG. 1, showing axial overlap of numerous openings of varying sizes and shapes along the distal end of the stem.

It is also recognized that the individual openings 38A and their associated windows 38AW (and likewise the openings 38C and windows 38CW), can have differing shapes (e.g., square, rectangular, oval, diamond-shaped, etc.), sizes, and distances of separation. Also, there may be more or less than six such openings. Further, the openings 38A and their associated windows 38AW can be positioned about the length and radius of the stem 32 so as to be separated from one another longitudinally, laterally and/or radially. For example, FIG. 6 depicts windows 38AW that have differing shapes and sizes, and which are separated from each other by a radial gap but would touch if aligned longitudinally. FIG. 7 depicts windows 38AW that have differing shapes and sizes, and which are separated from each other by a radial gap but would overlap if aligned longitudinally. Of course, with such configurations, the positioning and configurations of the lenses 42 and 48 within the cavity 37 will need to correspond to the positioning and shapes of the windows 38AW. Such minor configural variations would be well within the knowledge of one of ordinary skill in the art.

With particular regard to FIGS. 8-11, the angular ledge 204 need not be perfectly uniform or helical, so long as the angular ledge 204 performs its function of directing a sufficient amount of the reflected light V, of sufficient intensity and quality, upward through the stem 32 to the image sensor 52, to enable the image sensor 52 to collect a sufficiently representative strip-shaped image from the upper face 206 of the angular ledge 204. Rather, for example, the upper face 206 can be formed of a collection or series of interconnected or discrete horizontal ledges. In addition, the upper face 206 need not be perfectly straight in cross-section. Rather, the upper face 206 can, for example, be curved to focus or concentrate the reflected light V in a desired manner to improve the collection of the color image from the upper face 206. The upper face 206 can also be somewhat irregular, so long as the upper face 206 performs its function as described herein. Moreover, the lower surface 208 can be any of a variety of cross-sectional shapes, so long as the angular ledge 204 has sufficient horizontal and vertical rigidity.

Further, instead of a light-reflecting angular ledge 204 that projects outward from the shaft 202, the shaft 202 can be constructed of a light-transmitting material and a helical groove having the same cross-sectional contours of the angular ledge 204 can be cut or formed in the outer surface of the shaft 202 such that the helical groove has a light-reflecting surface that receives the reflected light from the cross-section of the body of food proximate the window 38BW, and directs the light upward through the shaft 202 to an image sensor 52 positioned at the upper end of the shaft 202. In this configuration, the shaft 202 becomes a light transmitting conduit. Moreover, the upper face 206 can simply comprise a reflective material embedded in the transparent shaft 202, or an interface of two materials that results in a reflective surface.

By way of further example, the shaft 202 need not be cylindrical, but may have other cross-sectional shapes, such as for example, an oval a square, a rectangle, or a triangle, so long as the shaft 202 structurally supports the angular ledge 204 and allows the angular ledge 204 to function as described in this disclosure. Thus, the shaft 202 cross-section may for example be a uniform or non-uniform many-sided polygon. Similarly, the shaft 202 need not have uniform cross-section along its length, but may instead be tapered, tiered, stepped or curved, so long as the shaft 202 structurally supports the angular ledge 204 and allows the angular ledge 204 to function as described in this disclosure.

Moreover, angular ledge 204 need not be helical, but may have other shapes along its length, so long as the upper face 206 functions to accurately direct a strip-shaped color image that is representative of the cross-section of food F proximate the window 38B, upward to the image sensor 52. For example, the shaft 202 may have a flat face and the angular ledge 204 could extend in a diagonal manner along such flat face.

In addition, the helical window 38B need not be a single contiguous window. Rather, just as with regard to the windows 38AW in FIGS. 1-2 and 6-7, the helical window 38BW can be an elongated collective window formed of two or more discrete windows, with the computer processor C performing digital interpolation and blending of the two or more discrete color images to generate a single strip-shaped color digital image.

Further, the window 38B may comprise a simple opening without any material, or may comprise one or more optical elements to direct, focus, concentrate or otherwise control the light directed through the window 38B.

In order to prevent a longitudinal overlapping of one end of the helical window 38BW over its other end as the window 38BW winds about the distal end 36, the functional length of the helical window 38BW is designed to have a longitudinal length that wraps along one full axial revolution about the distal end 36. Thus, if the helical window 38BW has a longitudinal length of two inches, the ledge's pitch ratio will be set to ½—i.e., one revolution per two inches. While it is preferable that the pitch ratio is set at one (i.e., where the helical length of the angular ledge 204 is equal to the longitudinal length of the helical window 38BW), the optical element 201 will still function generally as described hereinabove if the pitch to helical window longitudinal length ratio is other than one, and where the helical window 38BW encircles the distal end 36 in one full axial revolution. For example, if the if the pitch ratio is ½, the helical window 38BW will be "stretched out" to a longitudinal length that is twice the length of an embodiment having a pitch ratio of 1. This allows for a much deeper penetration of the probe into the subject food, but requires a much steeper ledge 204. The steeper the ledge 204, the less reflected light is collected from any given length of the helical window 38BW, and directed up the stem of the probe, which imparts somewhat greater demands on the light collection and sensing components of the probe. Conversely, if the pitch ratio is 2, the helical window 38BW will be "compressed" to a longitudinal length that is one half the length of an embodiment having a pitch ratio of one. This only allows a much shallower penetration of the probe into the subject food, but features a much shallower ledge 204, which eases somewhat the demands on the light collection and sensing components of the probe.

Moreover, the helical window 38BW can be designed to be less than or greater than one axial revolution about the distal end 36. However, such configurations will have shortcomings. For example, if the helical window 38BW encircles the distal end 36 by more than one full axial revolution, portions of the angular ledge 204 will axially overlap one another when viewed down the length of the probe's distal end 36. If the helical window 38BW encircles the distal end 36 by less than one full axial revolution, portions of the helical window 38BW will have no corresponding portion of angular ledge 204 when viewed down the length of the probe's distal end 36.

Referring specifically to FIGS. 12-15, the upper faces 306 need not have the same contours as the corresponding lengths of the upper face 206 of the ledge 204. Rather, one or more of the upper faces 306 may, for example, be at a right 45 degree angle to the shaft 202. By way of further example, the faces 306 may be contoured to form a reflective surface, such as convex or concave, to control or direct the light reflected off the interior of the body of food. These variations are to be made so as to enable the probe to collect the light reflected off the interior of the body of food and direct it to an electronic sensor, such as the sensor 52, to generate a digital image that corresponds to the cross-section or portion of the food being probed.

Additional variations or modifications to the configuration of the novel mechanism of the present invention, shown by way of example as embodiments of the probe depicted in the Figures may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention. Accordingly, all matter contained in the above description or shown in the accompanying drawings should be interpreted as illustrative and not in a limiting sense.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

What is claimed is:

1. An electronic visual food probe for insertion into an interior portion of a body of food to provide a color image of a cross-section of said interior portion proximate said probe, said food probe comprising:
   a. a substantially rigid stem having a proximal end and a distal end opposite said proximal end;
   b. an inner chamber positioned at least in part in said stem distal end;
   C. two or more discrete openings in said stem distal end, both of said two or more discrete openings penetrating into said inner chamber, said two or more discrete openings positioned proximate one another and in combination forming an elongated collective opening, said elongated collective opening having a longitudinal length along said stem distal end of at least one-half inch;
   d. a light source, said light source illuminating said cross-section of said interior portion of said body of food proximate said elongated collective opening so as to create an illuminated region of said cross-section visible through said elongated collective opening;
   e. a first electronic image sensor, said first electronic image sensor receiving reflected light from said elongated collective opening, said first electronic image sensor generating electronic data from said reflected light that corresponds to a strip-shaped color image indicative of at least a portion of said illuminated region; and
   f. an electronic display system comprising a computer processor and an electronic display, said computer processor receiving said electronic data from said electronic image sensor and converting said electronic data into an electronically displayable image indicative of said strip-shaped color image, said electronic display system displaying said displayable image on said electronic display.

2. The electronic visual food probe of claim 1, wherein at least two of said two or more discrete openings of said elongated collective opening comprise one of: (i) the same size and shape; (ii) differing sizes relative to each other; and (iii) differing shapes relative to each other.

3. The electronic visual food probe of claim 1, wherein at least two of said two or more discrete openings of said elongated collective opening are separated from one another by one or more of: (i) a lateral displacement about said stem; and (ii) a longitudinal displacement along said stem.

4. The electronic visual food probe of claim 1, wherein, said electronic display system interpolates said electronic data so as to generate a contiguous electronically displayable image.

5. The electronic visual food probe of claim 1, wherein when said stem distal end is inserted to a desired position within said interior portion of said body of food, said first electronic image sensor generates said electronic data without repositioning said stem distal end from said desired position.

6. The electronic visual food probe of claim 1, wherein said elongated collective opening has an elongated insertion portion, said elongated insertion portion comprising the length of said elongated collective opening inserted into said body of food, said electronic display system truncating said electronically displayable image so as to display no more of said elongated collective opening than said elongated insertion portion.

7. The electronic visual food probe of claim 1, further comprising a window positioned at least in part in at least one of said two or more discrete openings of said elongated collective opening, said window being at least in part either translucent or transparent to visible light.

8. The electronic visual food probe of claim 1, further comprising a temperature sensor, said temperature sensor positioned proximate said elongated collective opening, said temperature sensor sensing the temperature in proximity to said elongated collective opening and communicating an electronic signal indicative of the temperature sensed by said temperature sensor to said electronic display system, said electronic display system presenting information on said electronic display indicative of the temperature sensed by said temperature sensor.

9. The electronic visual food probe of claim 1, further comprising a first optical element positioned in said inner chamber proximate said elongated collective opening, said first optical element being oriented to receive said reflected light from at least a portion of said illuminated region through said elongated collective opening, said first optical element conveying said reflected light to said first electronic image sensor.

10. The electronic food probe of claim 9, wherein said first optical element comprises an elongated light governing portion configured in a generally helical fashion.

11. The electronic food probe of claim 9, wherein said first optical element comprises one of (i) a light admitting optical face; (ii) a mirror; (iii) an optical lens; (iv) a compound optical lens; (v) a diffraction optic; (vi) a collection of micro-optical lenses; and (vii) an array of optical lenses.

12. The electronic visual food probe of claim 1, wherein said elongated collective opening is configured in a generally helical fashion about said stem.

13. The electronic visual food probe of claim 1, further comprising a wireless transmitter and a wireless receiver, said wireless transmitter wirelessly communicating said electronic data from said wireless transmitter to said wireless receiver, said wireless receiver communicating said electronic data to said computer processor.

14. A stem assembly for an electronic visual food probe, said probe having an electronic image sensor, said stem assembly comprising:
   a. a substantially rigid stem, said stem having a proximal end and a distal end, said stem extending in a substantially longitudinal fashion between said proximal and distal ends, said distal end having a cavity;
   b. an elongated opening in said stem proximate end penetrating into said cavity, said elongated opening having a longitudinal length along said stem distal end of at least one-half inch; and
   c. a substantially rigid optical element positioned at least in part in said distal end cavity proximate said elongated opening, said optical element comprising an elongated light governing portion having a generally helical shape said elongated light governing portion having a longitudinal length of at least one-half inch, said elongated light governing portion directing visible light from said elongated opening toward said stem proximate end.

15. The stem assembly of claim 14, wherein said elongated light governing portion comprises a shaft and a visible light-directing elongated surface, said elongated surface extending about said shaft in a generally helical fashion.

16. The stem assembly of claim 15, wherein said elongated surface has a substantially uniform pitch along the length of said shaft.

17. The stem assembly of claim 15, wherein said elongated opening is configured in a generally helical fashion about said stem so as to substantially match said generally helical shape of said elongated light governing portion.

18. The stem assembly of claim 15, wherein said elongated surface is positioned along one of: (i) a ledge extending at least in part radially outward from said shaft outer surface; (ii) a depression in said shaft outer surface, said shaft being adapted to transmit visible light; and (iii) a light path embedded in said shaft, said shaft being adapted to transmit visible light.

19. The stem assembly of claim 14, further comprising a window positioned at least in part in said elongated opening, said window being at least in part either translucent or transparent to visible light.

20. The stem assembly of claim 14, wherein said elongated opening comprises two or more discrete openings, said two or more discrete openings positioned proximate one another and in combination forming an elongated collective opening, said elongated collective opening having a longitudinal length along said stem distal end of at least one-half inch.

21. The stem assembly of claim 20, wherein at least two of said two or more discrete openings of said elongated collective opening comprise one of: (i) the same size and shape; (ii) differing sizes relative to each other; and (iii) differing shapes relative to each other.

22. The stem assembly of claim 20, wherein at least two of said two or more discrete openings of said elongated collective opening are separated from one another by one or more of: (i) a lateral displacement about said stem; and (ii) a longitudinal displacement along said stem.

23. The stem assembly of claim 20, further comprising a window positioned at least in part in one of said two or more discrete openings of said elongated opening, said window being at least in part either translucent or transparent to visible light.

24. The stem assembly of claim 14, further comprising a first light transmitting conduit positioned at least in part between said optical element and said stem proximal end, said first light transmitting conduit collecting light from said optical element and conveying said light to said stem proximal end.

\* \* \* \* \*